Feb. 8, 1949. W. L. SMITH 2,460,854
SHAFT TAPER GAUGE
Filed July 6, 1945 2 Sheets-Sheet 1

Inventor
WILLIAM L. SMITH
By Ralph L. Chappell
Attorney

Inventor
WILLIAM L. SMITH

Patented Feb. 8, 1949

2,460,854

UNITED STATES PATENT OFFICE 2,460,854

SHAFT TAPER GAUGE

William L. Smith, Bremerton, Wash.

Application July 6, 1945, Serial No. 603,569

4 Claims. (Cl. 33—174)

(Granted under the act of March 3, 1883, as amended April 30, 1928; 370 O. G. 757)

The present invention relates to improvements in a gauge and more particularly to a gauge for accurately measuring tapers of shafts or the like.

An object of the invention is the provision of a taper gauge having means providing for adjustment of the gauge for measuring the taper of shafts or the like of different sizes or diameter.

Another object is to provide a gauge which can be used to measure the taper of relatively large shafts or the like, and which can be handled by two men without the need of using a crane.

A further object is the provision of a taper gauge which can be applied laterally of the shaft without having to be applied over the end of the work as in the case of a ring gauge or the like.

Another object is the provision of a taper gauge which when set to the standard taper may be used to test the taper of or to reproduce a tapered shaft portion or the like, in large numbers and with efficient facility.

Other objects and advantages of the invention will be more apparent from the following description taken in connection with the accompanying drawings which are exemplary and in which.

Figure 2:
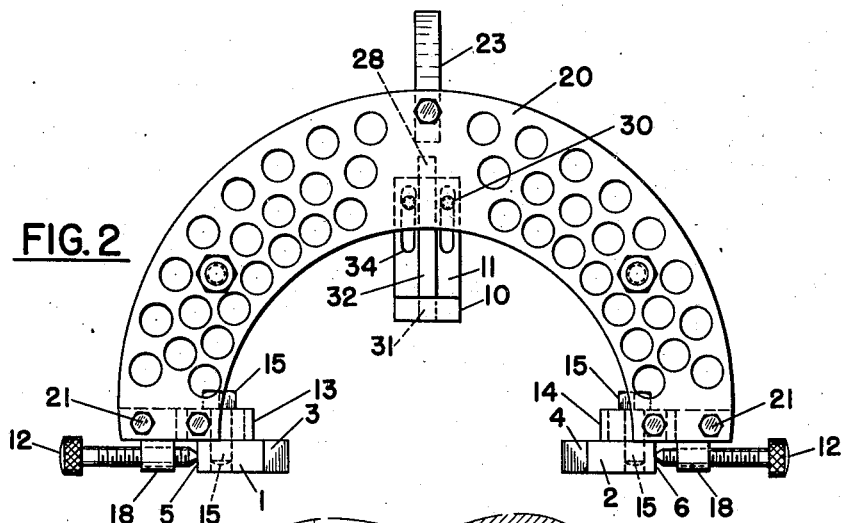
Fig. 2 is an end elevation of the gauge of Fig. 1 viewed from the narrow ends of the bars.
Figure 1:
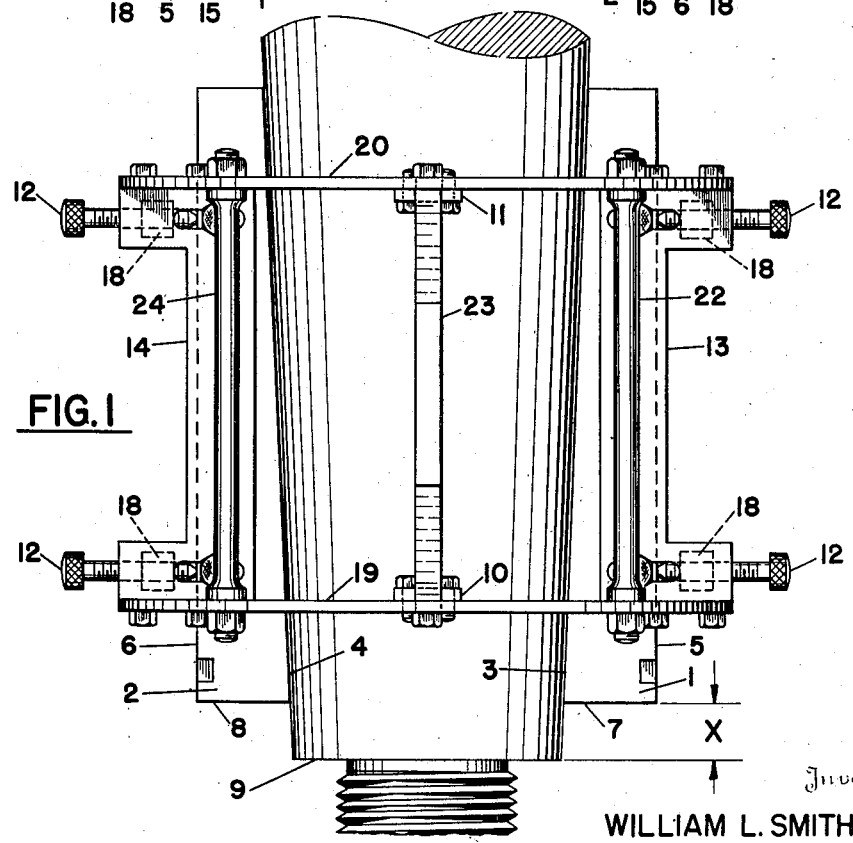
Fig. 1 is a plan view of a gauge embodying the invention, shown applied to a tapered shaft.

Referring to the drawings, 1 and 2 represent blades or bars, the inner edge faces 3 and 4 of which are machined to a desired taper, for example one inch to the foot, in respect to the outer edge faces 5 and 6 of the blades. Therefore, when the outer edges 5 and 6 of the bars are parallel, each inner edge face 3 and 4 will be inclined at that selected or desired taper in respect to the parallel outer edge faces. The bars 1 and 2 at their inner edge faces 3 and 4 are desirably of substantial thickness or depth, for example about an inch, to facilitate making a full length line contact of the said inner faces with a shaft of corresponding taper in a diametrical plane of the shaft, approximately in the longitudinal center of said inner faces of the bars.

In manually thus placing the gauge with the inner tapered edge faces 3 and 4 of the bars in line contact with the said shaft substantially in the longitudinal center of the said edge faces, this may be checked and further adjusted, if desired, by determining that the terminal ends 7 and 8 of the bars are substantially square and parallel to a reference plane such as the end or shoulder 9 of the shaft at right angles to the shaft axis.

Figure 3:
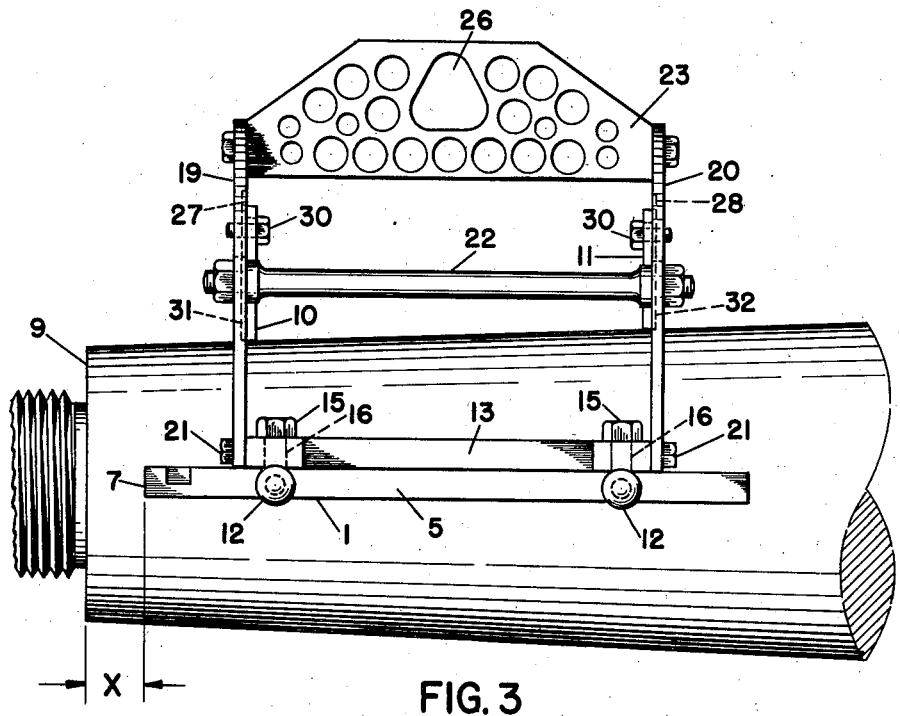
Fig. 3 is a side elevation of the apparatus and shaft shown in Fig. 1.
Figure 4:
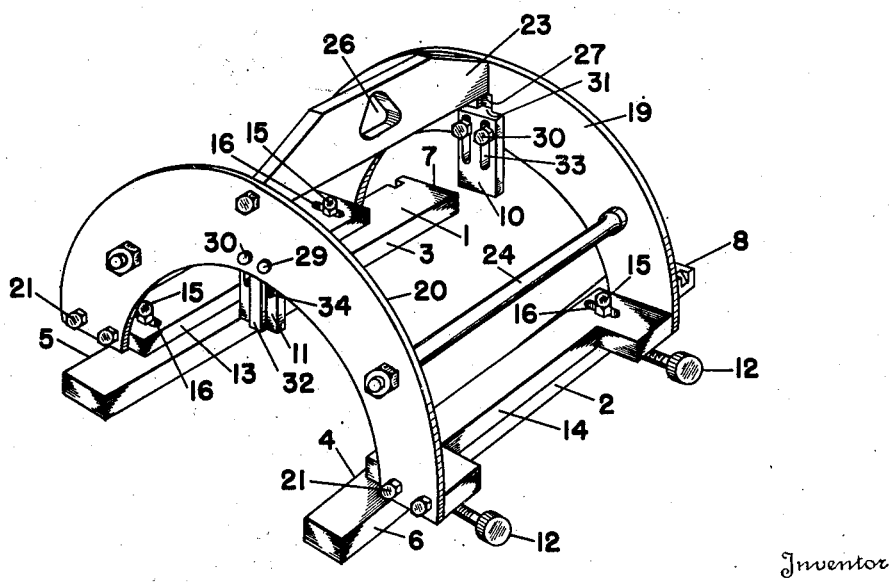
Fig. 4 is a perspective view of the gauge of Fig. 1, viewed from the narrow ends of the bars.

In placing the gauge on the shaft the two radially adjustable contact plates or members 10 and 11 are each adjusted to engage the tapered surface of the sample or standard tapered shaft, as indicated in Fig. 3.

With the gauge thus set according to the standard or sample shaft, it is then ready for use to check the taper of any number of other shafts, accurately and quickly. In checking the taper of a shaft being turned, the gauge is placed on the shaft, and it is then easily determined by comparison, where machining should be done.

Means are provided according to the invention for adjusting the blades or bars laterally toward or away from each other to fit various sizes of tapered shafts or to fit various portions of a tapered shaft along the length thereof, said means comprising micrometer screws 12.

The bars or blades 1 and 2 are disclosed in slidable engagement beneath fixed side members or plates 13 and 14 by means of screws 15 threaded into the blades and passing through lateral slots 16 in the side members with the heads of the screws engaging the surfaces of side members or plates 13 and 14 adjacent the slots. The side members may desirably be of substantially U-shape, as shown, with lugs 18 extending from the under sides of the arms thereof and having threaded bores receiving the micrometer screws 12. The micrometer screws 12 engage at their inner ends with the edge faces 5 and 6 of the blades.

Arcuate bridge members 19 and 20 are fixedly secured at their ends to the ends of the side members or plates 13 and 14, as by means of screws 21 or the like. The bridge members 19 and 20 are rigidly secured together by suitably fastened longitudinal brace members 22, 23, and 24, the intermediate brace member 23 desirably comprising a radially disposed plate of substantial area having an outwardly protruding portion provided with an opening 26 serving as a handle or for receiving hoist means.

Each of the end plates or bridge members 19 and 20 is provided at its inner face with a radial groove 27, 28 in alignment with each other longitudinally of the gauge. On opposite sides of the radial groove in each plate there are provided threaded bores 29 receiving screws 30.

The two radially adjustable contact plates 10 and 11 are provided with ribs 31, 32 and slots 33 and 34 on either side of the ribs, the ribs being slidably received and guided in the grooves 27 and 28, and the screws 30 extending through said slots and having heads to be clamped against the surface of the contact plates 10 and 11 in adjusted position of said plates.

The end plates or bridge members 19 and 20 and the brace member 23 may desirably be provided with apertures therein, reducing their weight.

In the use of the gauge, as hereinbefore indicated, it may desirably be set to a selected sample or standard shaft or hub templet of the selected size and having a certain taper corresponding to that to which the inner edge faces 3 and 4 of the bars or blades 1 and 2 are made, for example one inch to the foot, which is the taper of a large percentage of shafts made. The bars are set with their inner edge faces 3 and 4 in substantially central line contact with the standard shaft in a diametrical plane of the shaft, and the two radially adjustable contact plates 10 and 11 are adjusted and fixed in contact with the shaft. The parallel relationship of the outer edges 5 and 6 of the bars is preferably checked by obtaining identical readings between them at each end of the bars which proves the taper to be one inch to the foot. The gauge is then ready for use to check or measure the taper of shafts or the like, by placing it upon the shafts being turned or checked, and determining by comparison where machining should be done, if necessary, to reproduce the taper.

If it is desired to reproduce a taper on a shaft or the like in relation to a reference point or plane along the shaft, then it is necessary to measure a distance between the reference point on the standard shaft and a point on the gauge and to reproduce the taper with the gauge at that distance from a corresponding reference point on the shaft or the like being turned or checked.

In the embodiment shown, for example, if it is desired to reproduce the taper in the same relation to the shoulder 9 of the standard or sample shaft, then a distance X should be measured between the shoulder 9 and a point on the gauge, and the taper reproduced with the gauge at the distance X from the corresponding shoulder or reference point on the shaft being turned or checked.

Although but one embodiment of the invention is herein shown and described, it will be understood that various changes in the size, shape, and arrangement of parts may be made without departing from the spirit of the invention and it is not intended to limit the invention other than by the terms of the appended claims.

The invention described herein may be manufactured and used by or for the Government of the United States of America for governmental purposes without the payment of any royalties thereon or therefor.

What is claimed is:

1. A taper gauge comprising a pair of oppositely disposed bars having inner edge faces of substantial depth inclined at a desired taper in respect to the outer edges of the bars, plate members overlying said bars, a pair of spaced bridge members fixed to the ends of said plates, and disposed in planes perpendicular to said plates, contact members mounted on said bridge members for slidable adjustment inwardly or outwardly of said bridge members, and means mounting said bars on said plates for slidable adjustment of said bars toward or away from each other inwardly or outwardly of said plates.

2. A taper gauge comprising a pair of bars oppositely disposed in the same plane and having inner edge faces of substantial depth inclined at a desired taper in respect to the outer edges of the bars, plate members overlying said bars, a pair of spaced bridge members fixed to the ends of said plates and disposed in planes perpendicular to said plates, contact members mounted on said bridge members for individual slidable adjustment inwardly or outwardly of said bridge members, and means mounting said bars on said plates for slidable adjustment of said bars toward or away from each other inwardly or outwardly of said plates, said means comprising slots in the plates and headed screws or the like in threaded bores in the bars and extending through the slots with the screw heads overlying the surface of the plates, and micrometer screws mounted on the plates and engaging the outer edges of the bars for adjusting the bars inwardly of said plates.

3. A taper gauge comprising a pair of bars oppositely disposed in the same plane and having inner edge faces of substantial depth inclined at a desired taper in respect to the outer edges of the bars, plate members overlying said bars, a pair of spaced bridge members fixed to the ends of said plates and disposed in planes perpendicular to said plates, contact members mounted on said bridge members for individual slidable adjustment inwardly or outwardly of said bridge members, and means mounting said bars on said plates for slidable adjustment of said bars toward or away from each other inwardly or outwardly of said plates, said means comprising slots in the plates and headed screws or the like in threaded bores in the bars and extending through the slots with the screw heads overlying the surface of the plates, and micrometer screws mounted on the plates and engaging the outer edges of the bars for adjusting the bars inwardly of said plates, said contact members being slotted and headed screw means threaded into the bridge members and extending through the slots with the screw heads engaging the surface of the contact members.

4. A taper gauge comprising a pair of bars oppositely disposed in the same plane and having inner edge faces of substantial depth inclined at a desired taper in respect to the outer edges of the bars, plate members overlying said bars, a pair of spaced bridge members fixed to the ends of said plates and disposed in planes perpendicular to said plates, contact members mounted on said bridge members for individual slidable adjustment inwardly or outwardly of said bridge members, and means mounting said bars on said plates for slidable adjustment of said bars toward or away from each other inwardly or outwardly of said plates, said means comprising slots in the plates and headed screws or the like in threaded bores in the bars and extending through the slots with the screw heads overlying the surface of the plates, and micrometer screws threaded through lugs depending from the under sides of said plates and engaging the outer edges of the bars for adjusting the bars inwardly of said plates, said contact members being slotted and headed screw means threaded into the bridge members and extending through the slots with the screw heads engaging the surface of the contact members, each of said bridge members having a groove therein, and each of said contact members having a rib thereon disposed in the groove in its bridge member, and brace means between the bridge members designed to facilitate lifting and placement of the gauge.

WILLIAM L. SMITH.

REFERENCES CITED

The following references are of record in the file of this patent:

UNITED STATES PATENTS

| Number | Name | Date |
|---|---|---|
| 1,178,090 | Merritt | Apr. 4, 1916 |

FOREIGN PATENTS

| Number | Country | Date |
|---|---|---|
| 483,659 | Germany | Oct. 3, 1929 |
| 624,123 | Germany | Jan. 13, 1936 |